Jan. 30, 1945.  N. BARBIERI  2,368,085
METHOD FOR SURFACE ORNAMENTATION FOR THERMAL PLASTIC ARTICLES
Filed Dec. 17, 1943
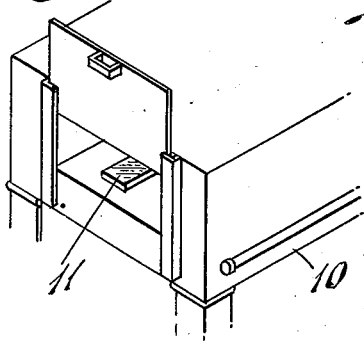
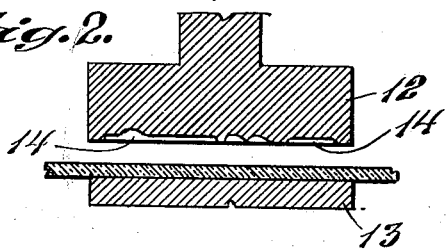
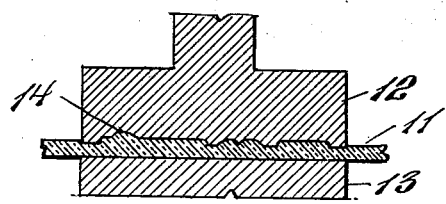
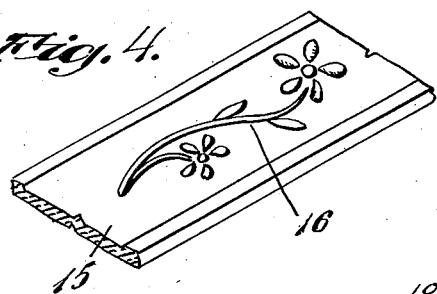
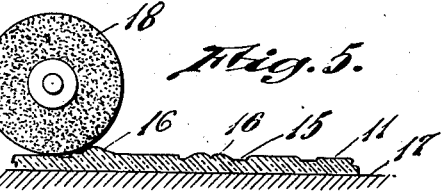
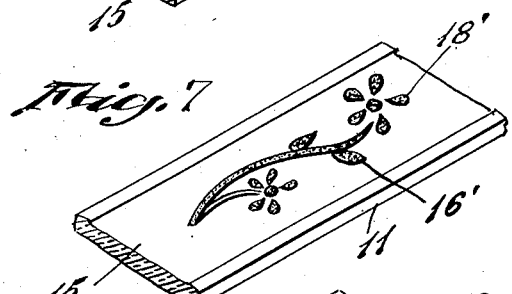
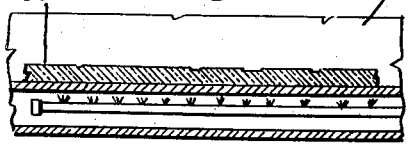
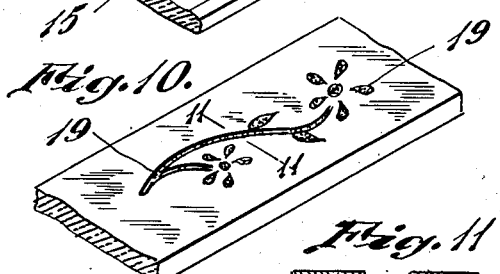
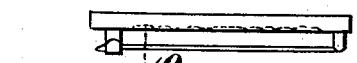
INVENTOR
Nicholas Barbieri
BY Barlow & Barlow
ATTORNEYS Patented Jan. 30, 1945

2,368,085

UNITED STATES PATENT OFFICE 2,368,085

METHOD FOR SURFACE ORNAMENTATION FOR THERMAL PLASTIC ARTICLES

Nicholas Barbieri, Providence, R. I., assignor to Uncas Manufacturing Company, a corporation of Rhode Island Application December 17, 1943, Serial No. 514,726

1 Claim. (Cl. 41—24)

This invention is for a method for surface ornamentation for thermal plastic articles and for manufacturing ornamental thermal plastic articles.

An object of the invention is to provide a simple and effective process for surface ornamentation for thermal plastic articles.

Another object of the invention is to provide a process for surface ornamentation for thermal plastic articles that may be carried out by machine processes.

Another object of the invention is to provide a process for surface ornamentation of thermal plastic articles in which the ornamentation will substantially resemble in appearance that provided by engraving or provided by an etching process on glass.

Another object is to provide a new process for manufacturing thermal plastic ornaments.

With these and other objects in view the invention consists of certain novel features as will be more fully described and particularly pointed out in the appended claims.

In the accompanying drawing:

Fig. 1 is a perspective view of an oven suitable for carrying out one of the steps of the invention;

Fig. 2 is a sectional view of a die suitable for performing another step of the invention;

Fig. 3 is a view similar to that shown in Fig. 2 but with the die closed upon the article to be decorated;

Fig. 4 illustrates the article in perspective, showing surface deformations as produced by the die;

Fig. 5 illustrates a further step in the process of the instant embodiment of the invention;

Fig. 6 is a sectional view of the article acted upon subsequent to the operation performed by the device shown in Fig. 5;

Fig. 7 illustrates in perspective the article shown in Fig. 6;

Fig. 8 illustrates another step in the process;

Fig. 9 is a sectional view showing the article with surface deformations in the inverse order as that shown in Figs. 3 and 4;

Fig. 10 is a perspective view of the article with the finished ornamented surface;

Fig. 11 is a sectional view on an enlarged scale and taken substantially on line 11—11 of Fig. 10;

Fig. 12 is a view similar to that shown in Fig. 11 and with colored material added to the walls of the cavity;

Figs. 13 and 14 illustrate two different articles made in accordance with the process herein described.

I have discovered that certain thermal plastic materials in sheet form when sufficiently softened by heat, then deformed under force into a different shape and permitted to set in such deformed condition will substantially recover initial size and shape when subsequently reheated.

In accordance with the invention the thermal plastic article having the above properties is first heated to a sufficient degree to soften the same to be readily compressed to receive the chosen design. The article while in the softened condition is acted upon with suitable devices so as to substantially compress the material about the portion thereof forming the design. This will provide a portion of material raised above the surface of the surrounding material in the form of the design desired and in which relatively little or no compression force has been applied.

The article is then permitted to cool and set in such deformed condition. Next about seventy-five per cent of the raised portion of the design is removed by any convenient manner such for example as by grinding.

The article is next reheated to about the same temperature as that used for softening which will cause the compressed portion of the material to recover size, that is it will spring back to substantially its original thickness. There will be in this recovered surface recesses or cavities of a depth substantially that of the thickness of material removed and of forms corresponding to the shape of the raised portions prior to being removed.

When a clear transparent thermal plastic article is to be decorated the design may be applied on the rear surface of the article. The raised portion of the material is removed by grinding which will provide the remaining portion of this raised material with a fine abraided surface. In the completed decoration this abraided surface when viewed through the material will have a beautiful so-called frosted appearance.

If desired gold foil, silver foil, paints, and/or the like may be inlaid in the recesses or cavities to thereby intensify the decorative effect of the design.

Referring to the drawing for a more detailed description of the invention and in which drawing I have illustrated one method of practicing the invention, 10 shows an oven which may be of any of the approved manufacture and which may be heated to about 275° to 300° Fahrenheit. In this oven is placed a strip 10 of thermal plastic sheet material 11. A thermal plastic material in the form of sheet stock in the synthetic resin group which has been found suitable for this invention is that known as "Lucite," which is a methyl methacrylate. This material I find preferable in many instances because of its freedom of all color and clear transparency.

Another plastic in sheet form which has been found suitable is that known in the art of plastics as "Plastacele," which is a cellulose acetate.

After the strip 11 has been heated to soften the same sufficiently to readily have the design impressed thereon, it is positioned between the parts 12—13 of a suitable die. The upper part 12 of the die has in its surface suitable cavities 14 therein forming the design to appear in the finished article. The parts of the die are moved towards each other and force is applied to compress all of the material between the parts of the die sufficiently so as to fill all of the cavities of the die part 12. The strip is held between the die parts until set in this deformed condition. It will be understood that the portion of the strip 11 directly beneath the cavities in the die part 12 will have been compressed only sufficient to fill the cavities and conform to the shape thereof.

After the strip 11 has sufficiently cooled and set in the deformed condition it is removed from between the die parts. The portion 15 thereof will, as best seen in Fig. 4, be of substantially less thickness than the original size and the thickness of the sheet 11 at the raised portion 16 forming the design will be substantially of the same initial thickness. The strip 11 is next positioned on the table 17 of a suitable grinding device and the grinding disk 18 set to remove about seventy-five per cent of the raised portion 16. Although I prefer to remove about seventy-five per cent of the raised portion, this is not critical and the entire raised portion may be removed and even part of the material of the portion 15 may be removed. The amount of material removed is conditional upon the results desired.

Employing a grinding process for removing part of the raised portion 16 will provide the surface 18' on the remaining portion 16' of the portion 16 with fine abrasions thereon which will give the decoration a so-called frosted surface seen in a cut glass design and that provided by an etching process.

The strip 11 is next returned to the oven 10 and reheated to a degree sufficient for the thermal material to recover initial size. This recovered surface will now have cavities 19 therein conforming substantially in depth and in form to the cavities 14 in the die part 12. The walls of the cavities 19 will have a frosted surface 20. In some instances it may be desired to color the walls of the cavities and foil, paint, and/or the like material 21 may be inlaid and secured to the wall by adhesion or any other manner known in the art.

The strip is now cut to the desired shape which may take the form of a brooch shown in Fig. 13. It may be made into a picture frame as shown in Fig. 14. I may in some instances apply an appropriate design to the plastic strip and subsequently form the same into a jewel such as a cameo.

I have shown and described an oven as a means of heating the plastic article or strip material to soften the same. However, the plastic material may be heated in various other ways. The die itself may have a heating unit incorporated therein in a manner well known in the plastic art. A die has been shown for impressing the design into the strip material. However, it can be readily conceived that the strip material may be passed between rollers the surface of which may have the desired design.

It will be apparent that a translucent or opaque thermal plastic material or one that is colored may be employed in carrying out the invention. When an opaque material is chosen the design should be placed on the front surface of the article.

I claim:

The method of decorating thermal transparent plastic articles which consists in applying sufficient heat to the article to soften the same and while in softened condition impressing a design in relief on the article and then permitting the article to cool to set in such deformed condition, then removing by grinding part of the raised portion of the stock and subsequently subjecting the article to sufficient heat to cause the deformed part of the article to recover its initial size and form.

NICHOLAS BARBIERI.